United States Patent
Bobba et al.

(10) Patent No.: US 6,223,986 B1
(45) Date of Patent: May 1, 2001

(54) AIMING AID FOR OPTICAL DATA READING

(75) Inventors: Mohan L. Bobba; Robert W. Rudeen; John A. Hofer, all of Eugene, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/058,501

(22) Filed: Apr. 10, 1998

(Under 37 CFR 1.47)

Related U.S. Application Data

(60) Provisional application No. 60/043,725, filed on Apr. 17, 1997.

(51) Int. Cl.[7] ............................... G06K 7/10; G06K 9/24
(52) U.S. Cl. ................................ 235/462.2; 235/462.21
(58) Field of Search ..................... 235/462.2, 462.21, 235/462.45, 472.01, 472.02, 472.03, 473, 453, 454; 359/15–19; 250/566

(56) References Cited

U.S. PATENT DOCUMENTS

| | | |
|---|---|---|
| 4,538,880 | 9/1985 | Reinhold . |
| 4,603,262 | 7/1986 | Eastman et al. . |
| 4,758,058 | 7/1988 | Cato et al. . |
| 4,939,355 | 7/1990 | Rando et al. . |
| 5,132,525 | 7/1992 | Swartz et al. . |
| 5,296,689 | 3/1994 | Reddersen et al. . |
| 5,475,207 | 12/1995 | Bobba . |
| 5,479,011 | 12/1995 | Rudeen et al. . |
| 5,526,144 | 6/1996 | Dickson . |
| 5,723,852 | 3/1998 | Rando . |
| 5,734,153 | * 3/1998 | Swartz et al. . |

FOREIGN PATENT DOCUMENTS

357147003A * 9/1982 (JP) .

OTHER PUBLICATIONS

Brochure: Plastic Diffractive Optics, Mems Optical, Inc., Huntsville, Alabama (Feb. 5, 1997).

* cited by examiner

Primary Examiner—Karl D. Frech
(74) Attorney, Agent, or Firm—Lyon & Lyon LLP

(57) ABSTRACT

A data reading systems including an aiming aid system which creates a highly visible target or image in the scan volume at a preferred location for placement of the article to be scanned. In a preferred application, an overhead bar code scanner employs a rotating polygon mirror which scans one or more laser beams off pattern mirrors creating a complex pattern of scan lines down into the scan volume whereby the aiming aid is created by directing a laser beam onto a scanning mirror positioned on top of the polygon mirror generally along the rotational axis of the polygon mirror and then directing that beam out into the scan volume in the desired pattern, such as a circular aiming aid. Alternately, the aiming aid may be a multi-dimensional graphical image formed by holographic or diffractive optics.

22 Claims, 8 Drawing Sheets

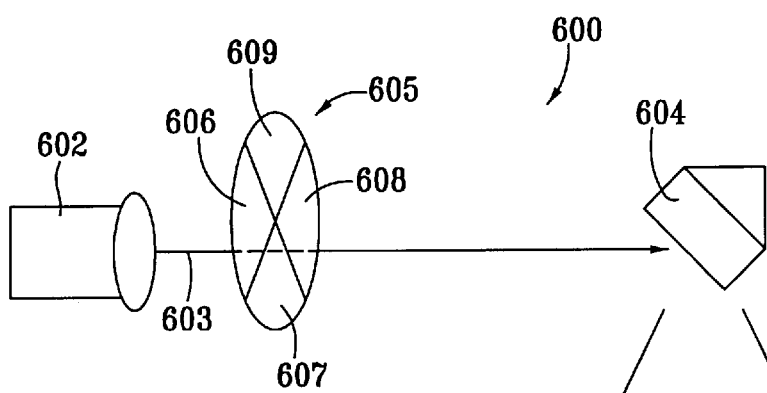
FIG. 8
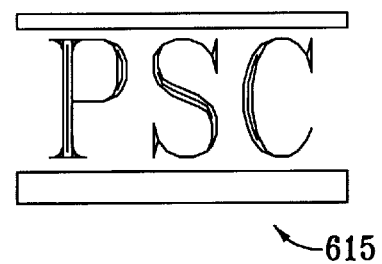

AIMING AID FOR OPTICAL DATA READING

This application is a continuing application of provisional application Ser. No. 60/043,725 filed Apr. 17, 1997.

BACKGROUND OF THE INVENTION

The field of the present invention relates to optical scanning systems and particularly to an aiming system and method for use with an optical scanning system. The aiming system is especially suitable for use with a laser scanner for reading optically readable codes such as those found on consumer and industrial products, most frequently bar code and other symbols.

Bar code scanners, as any optical system, require outgoing scan beam to be properly drawn over the intended target such as the bar code. Handheld laser scanners normally form a single scan line which must be aimed to traverse the entire bar code. Over longer distances, which for long range scanner may be several feet, scan lines become diffuse such that they are not readily visible on a target, making it difficult for the operator to properly aim the scanner at the target or effectively manipulate the target to be read. In response to this problem, laser scanners such as described in U.S. Pat. Nos. 4,603,262 and 5,296,689 have been developed employing a pointer beam or aiming light which is visible over a greater distance to aid the user in aiming the handheld scanner.

In fixed scanners, the scan patterns tend to be multidirectional, generating a complex scan pattern forming a scan volume. Items to be scanned are passed through the scan volume and the bar code on the item is read. Such a scanner is the PSC Inc. Magellan T scanner (formerly sold under the Spectra-Physics Scanning Systems, Inc. label) which is described in U.S. Pat. No. 5,475,207. Aiming beams are not required for fixed scanners primarily because the scan volume through which the item is being passed is typically more intuitive, the checkout clerk learning to orient the item with the bar code facing a window.

Nonetheless, the present inventors have recognized the potential to facilitate scanning in the fixed scanner environment.

SUMMARY OF THE INVENTION

The present invention relates to data reading systems and particularly to a visual enhancement system for use with a data reading system. The invention is particularly suitable in scanning systems where the user passes an item bearing a symbol through a scan volume in which a fixed scanner generates a scan pattern. In one preferred embodiment, the visual enhancement comprises an aiming aid system for an overhead bar code scanner. The aiming aid system creates a highly visible target or image in the scan volume at a preferred location for placement of the article to be scanned thereby guiding the user toward proper placement of the article. In a preferred application, an overhead bar code scanner employs a rotating polygon mirror which scans one or more laser beams off pattern mirrors creating a complex pattern of scan lines down into the scan volume. An aiming aid is created by directing a laser beam onto a scanning mirror positioned on top of the polygon mirror generally along the rotational axis of the polygon mirror and then directing that beam out into the scan volume in the desired pattern, such as a circular aiming aid. The user may then take the object to be scanned, such as an overnight letter or parcel, and place it in the scan volume with the location of the circular aiming aid directing the user to the proper location for the parcel. The circle size and/or focus may also direct the user to the proper focal distance from the scanner.

BRIEF DESCRIPTION OF THE DRAWINGS

FIG. 8 is a diagrammatic view of an alternate system with a multiple position diffuser optic.

DESCRIPTION OF THE PREFERRED EMBODIMENTS

The preferred embodiments will now be described with reference to the drawings.

Figure 1:
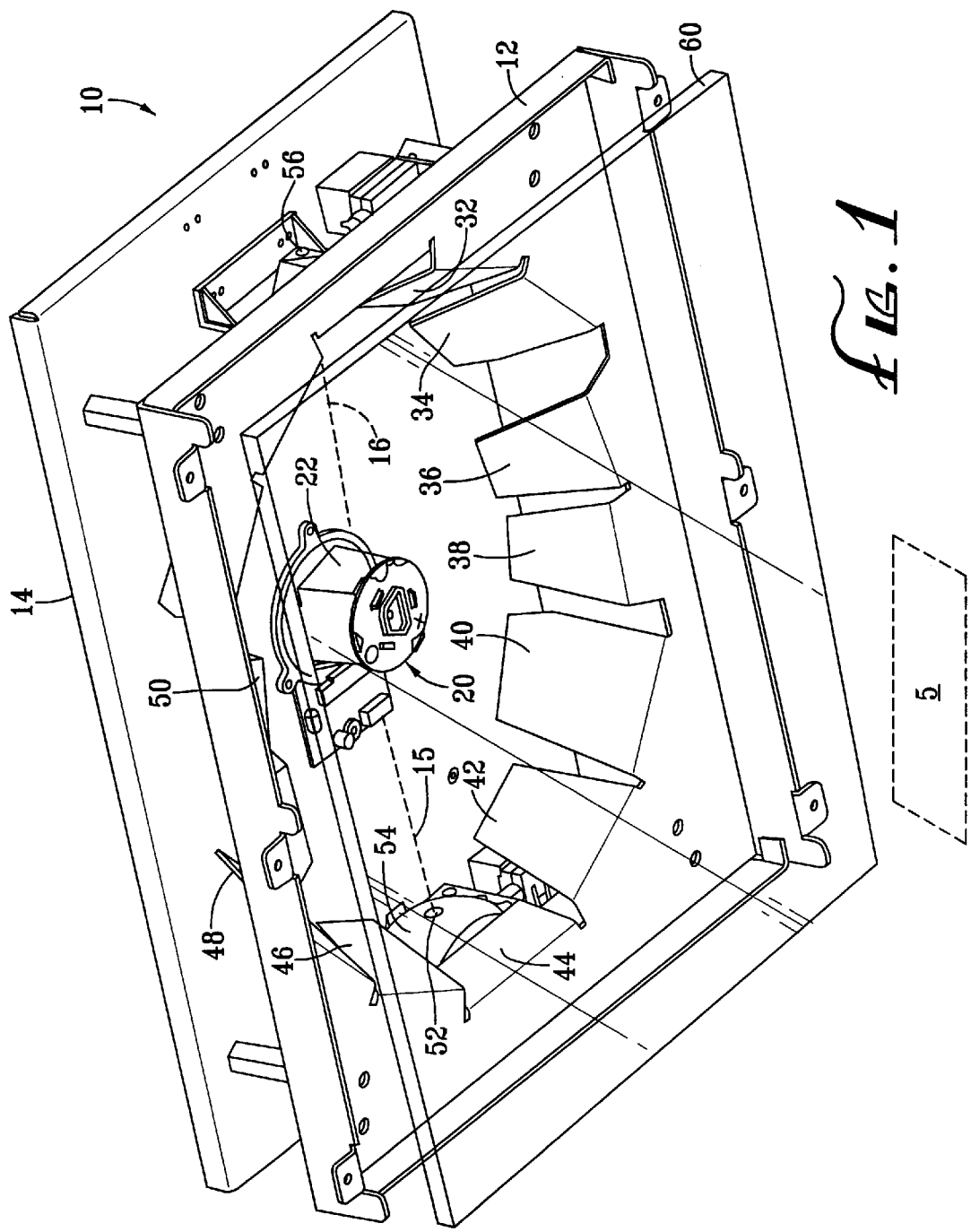
FIG. 1 is a perspective view of an overhead scanner according to a preferred embodiment of the present invention.

FIG. 1 is a partially exploded perspective view showing a scanner 10 which may be installed in an overhead housing or structure above a scan volume (schematically designated by dash lines 5). Such a scanner 10 may be employed where large objects such as parcels being handled by an overnight courier service have a label which is required to be scanned. The scanner operator typically wants to be able to view the labels on the courier envelope or parcel. It is, therefore, undesirable to turn the parcel over in order to be scanned by the typical in-the-counter scanner. Details of such an overhead scanner system are described in U.S. application Ser. No. 08/659,982, now U.S. Pat. No. 6,047,889, herein incorporated by reference.

The scanner 10 includes a chassis 12 which is mounted to a housing base 14. The scanner 10 generates a scan pattern by directing one or more laser reading beams onto a rotating polygon mirror 20, the polygon mirror having in this embodiment four facets 22. The scanner 10 may have one or more laser diodes for producing the reading beams which are directed onto the rotating polygon 20. In FIG. 1, the scanner has a reading beam 15 generated by a first laser diode (not visible in the figure but behind lens 54) which is focussed by a focussing lens 52 onto the rotating polygon 20, the rotating polygon scanning beams across pattern mirrors 38, 40, 42, 44, 46, 48, 50 which reflect the scanning beams out through the window 60 and down into the scan volume 5. At the same time, or alternately depending upon the particular configuration, a second laser diode 56 generates a second reading beam 16 which is focussed by a similar focussing lens and directed onto the polygon mirror 20 which distributes and scans the reading beam 16 across pattern mirrors 32, 34, 36, 38 (as well as pattern mirrors similarly situated on the opposite side but are not visible in the figure) which reflect the scanning beams out through the window 60 into the scan volume 5. Laser light reflected or scattered off the target is directed back along return path off the respective pattern mirror, off the mirror polygon and is focussed by focussing lens 54 or its counterpart on the other side onto a respective detector. The detector converts the light detected into an electrical signal and the resulting signal is then processed by the scanner.

To obtain an enhanced depth of field, more than one laser beam may be simultaneously or alternately directed along the optical path of beams 15, 16. The two (or more) laser beams along the path of reading beam 15 for example may be generated by separate laser diodes or by a single laser diode and a beam splitter with the beams being configured to focus at different focal distances within the scan volume. Such a configuration would then have potentially two laser diodes, each producing a laser beam along the optical path with similar pair of laser diodes on the opposite side of the polygon mirror 20. This configuration provides a very dense scanning pattern having a large depth of field. Other methods to generate dense scan patterns may be employed; such configurations are described in U.S. Pat. No. 5,475,207 herein incorporated by reference.

Alternately, a method may employ a single laser diode to produce multiple beams at different focal distances (i.e., to create a greater depth of field). Alternately, a single beam itself may be multiplexed to focus at different distances such as described in U.S. Pat. No. 5,479,011 herein incorporated by reference.

FIGS. 2–5 illustrate various configurations for producing a visual enhancement or a suitable aiming aid for the scanner.

Figure 2:
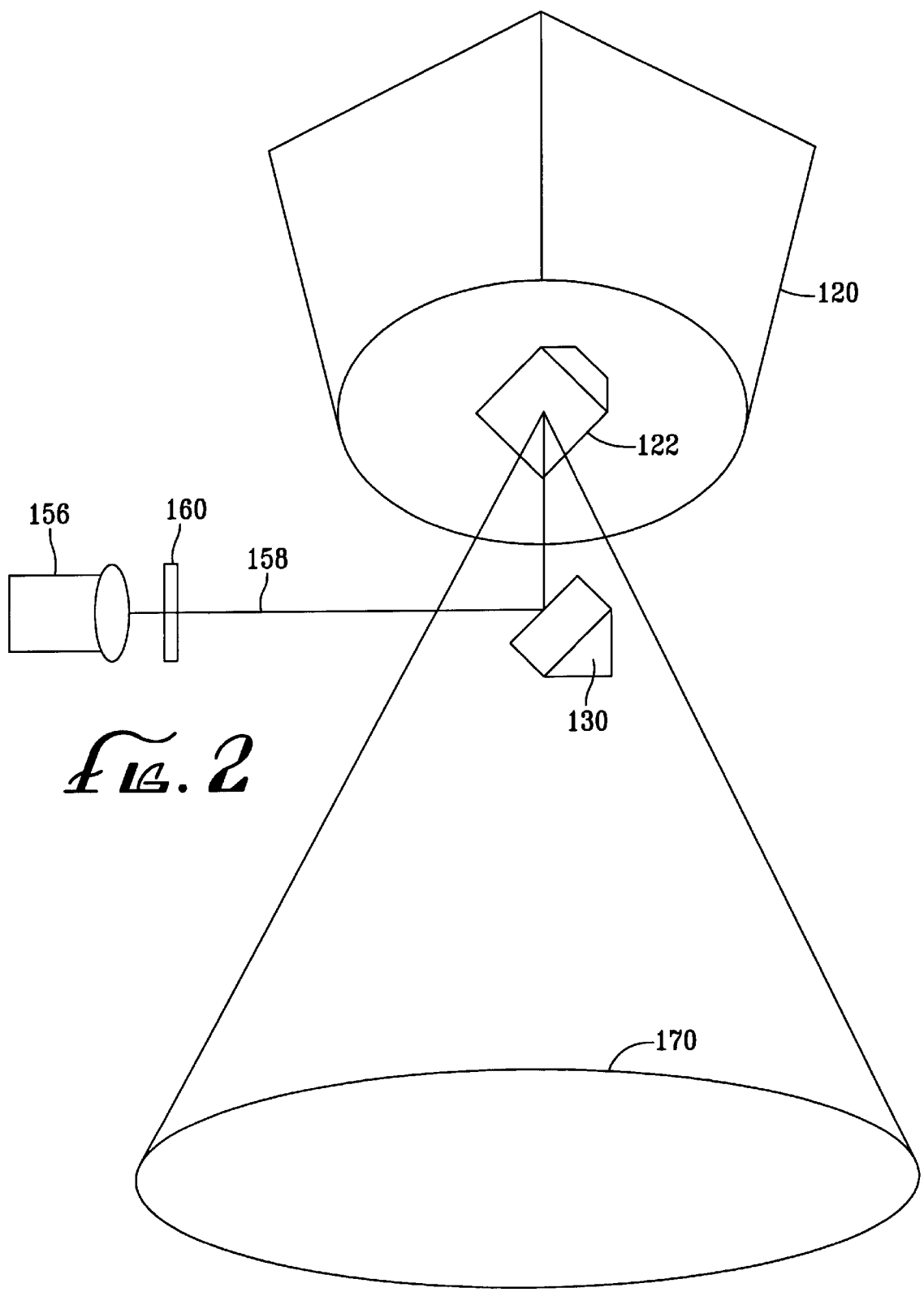
FIG. 2 is a schematic of an aiming system according to a preferred embodiment of the present invention.

Simultaneously while the scanner 10 (of FIG. 1) is generating a scan pattern, as illustrated in FIG. 2, a separate laser diode 156 or other suitable source generates and directs a beam 158 onto a fold mirror 130. The fold mirror 130 may be positioned or mounted on the inside surface of the scanner window (such as window 60 in FIG. 1) or alternately, the fold mirror 130 may be integrally formed with the scanner window 60. The beam 158 is reflected by the fold mirror 130 along a path which is shown as generally parallel to the rotational axis of the polygon mirror 120. A scanning mirror 122 disposed on the top of the polygon mirror 120 reflects the light beam 158 back up through the window. The surface of the mirror 122 is oriented at an angle which when rotated reflects the light beam 158 to produce a generally circular pattern 170 within the scan volume. The light beam 158 may be selected for its visible properties in order to produce a bright line pattern 170. When the user places an article such as the parcel within the scan volume, the bright circle 170 notifies the user of the center of the scan pattern produced by the scanner 10 and normally by the time the bar code, for example, is placed proximate the aiming circle 170, the scanner 110 has already scanned the code and has indicated a successful read.

Scan timing, scan geometry or beam properties (such as the wavelength or intensity of the beam 158) may be selected so as not to disturb data scanning. For example, the beam 158 may be filtered by a filter element 160 to eliminate certain wavelengths so as not to interfere with data scanning. Similarly, the scanning reading beam may be at a certain frequency and filtered so as to avoid interference with the aiming aid. In another example, the scanning of movement of the aiming beam formed by the aiming device is timed so as to not coincide with the scanning beam of the data scanning element. Though the aiming aid system of FIG. 2 could be designed to provide data collection capability as well as the visual aiming aid function, the primary purpose of the aiming circle 170 is to provide a visual aid and therefore is not particularly configured for its data collection properties.

The light beam 158 may also be focussed to have diffusion characteristics such that its brightness or focus clarity may also provide the user with an indication as to the sweet spot not only as to position (position meaning for example the horizontal position relative to a vertically downward directed scan pattern) but also an indication of the axial distance for a sweet spot corresponding to the proper focal distance from the scanner 10. That is, when the aiming aid 170 is tightly focussed on the parcel, the parcel has been positioned at the optimum distance for scanning.

Figure 3:
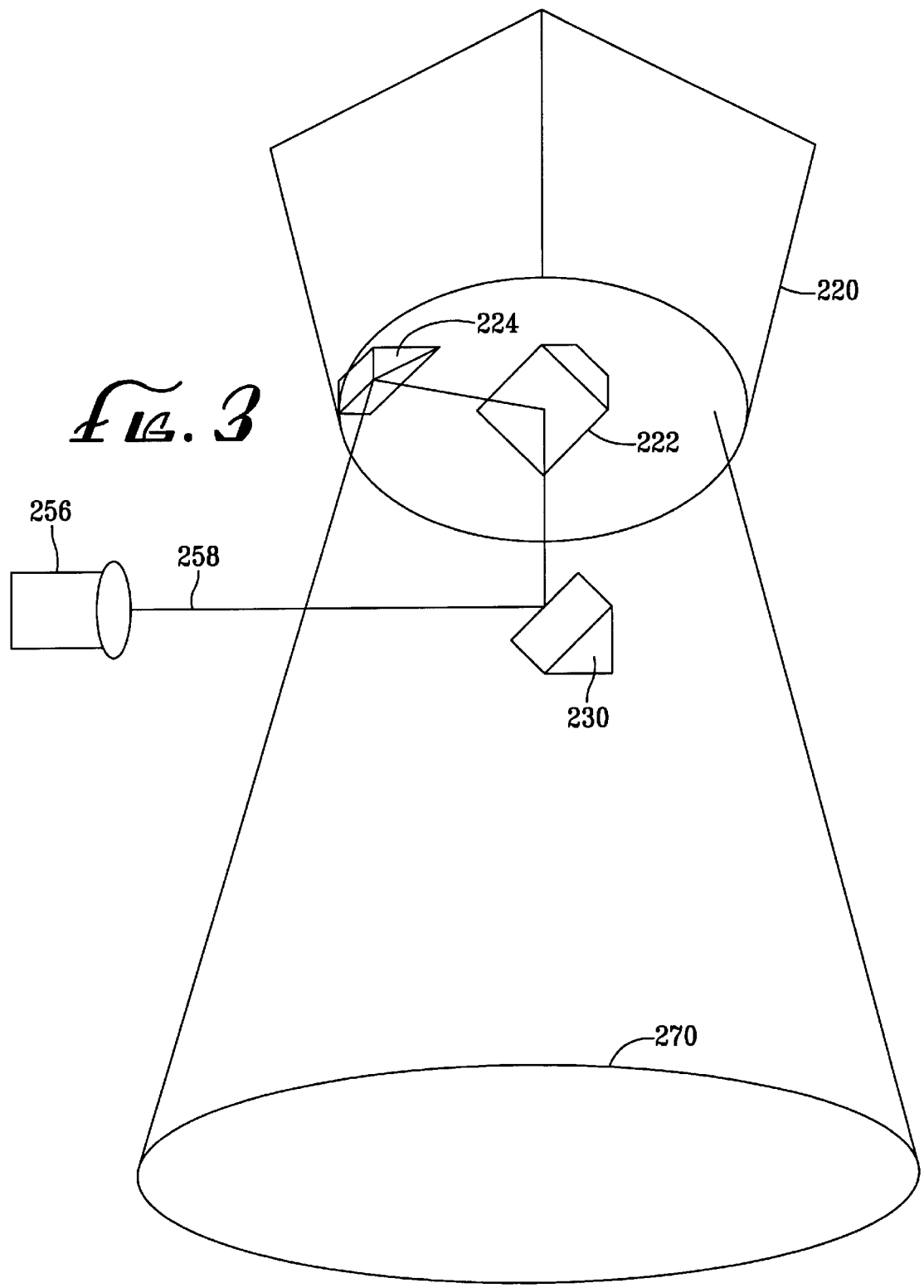
FIG. 3 is a schematic of an alternate aiming system according to another embodiment of the present invention.

FIG. 3 is an alternate configuration for producing a circular aiming aid 270. A light source such as laser diode 256 produces a beam 258 which is directed onto a fold mirror 230 also located on an inside surface of the scanner window. The fold mirror 230 directs the beam 258 along a path generally parallel to the rotational axis of the polygon mirror 220. A second fold mirror 222 is mounted on the top surface of the polygon mirror 220 and reflects the beam 258 at generally 900 to the rotational axis of the polygon mirror 220 and onto a third fold mirror 224 mounted on the top of the polygon mirror 220 located toward the outer periphery thereof. As the polygon mirror 220 rotates, the third fold mirror 224 rotates in a circular pattern tracing out a circular aiming aid 270 within the scan volume.

Figure 4:
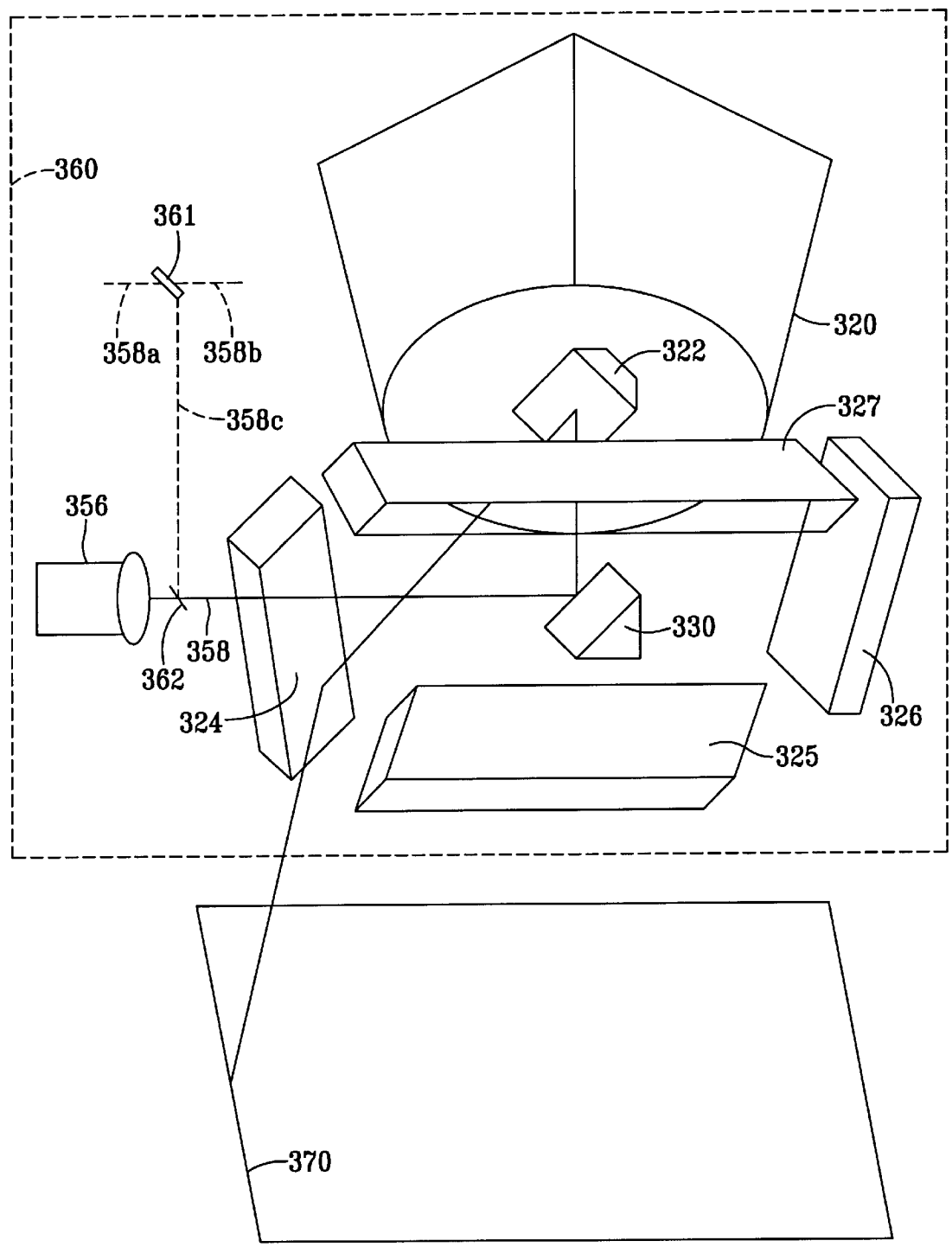
FIG. 4 is a schematic of an aiming system according to another embodiment of the present invention.

In some circumstances it may be desirable to produce some other two-dimensional geometric shapes of aiming aid. FIG. 4 illustrates another alternate embodiment for producing an aiming aid 370. The embodiments of FIGS. 2 and 3 produce a generally circular aiming aid, but by positioning of the various fold mirrors, a somewhat elliptical aiming aid may be produced. FIG. 4 illustrates a mirror configuration which produces a somewhat rectangular aiming aid 370. Such a rectangular aiming aid could, for example, approximate the label outline for the label on a parcel of an overnight courier package. Such a shape may encourage the user to more intuitively locate the parcel in an optimum location for scanning thereby enhancing productivity.

In the embodiment of FIG. 4, the light source 356 generates a beam 358 and directs it onto fold mirror 330 which reflects the beam onto a rotating mirror 322 mounted on the top surface of the polygon mirror 320. As the polygon mirror 320 rotates the beam is reflected across pattern mirrors 324, 325, 326, 327 tracing out a generally rectangular aiming aid 370 within the scan volume. Each of the pattern mirrors 324, 325, 326, 327 and the fold mirror 330 may be mounted to an inside surface of the scanner window 360, in some other suitable fashion, or may be formed integrally (e.g. molded therewith) with the scanner window 360.

Though each of these embodiments illustrates a separate light source such as a separate laser diode to produce the aiming beam, the aiming beam may be produced from alternate sources. For example, one of the laser diodes within the scanner 10 (see FIG. 1) may have its beam split by a beam splitter with the beam being directed by suitable fold mirrors. Such a configuration is shown schematically in FIG. 4 in which reading beam 358a is split by beam splitter 361 into reading beam 358b and aiming beam 358c. The aiming beam 358c is directed up to a fold mirror 362 thereby producing the light beam 358 which is directed onto the fold mirror 330. In that embodiment, the laser diode 356 would not be required.

Though the embodiment of FIG. 4 illustrates conventional pattern mirrors 324, 325, 326, 327, alternately these mirrors may constitute diffractive or holographic elements which may for example be embedded within or mounted to the scanner window 360. Such diffractive or holographic elements could produce a variety of geometric shapes or formations providing the desired visual aid within the scan volume. In a proper structure such as with additional optical elements in the user's field of view, such configuration may produce a holographic image, even a multi-dimensional (two- or three-dimensional) holographic image within the scan volume. For example, the graphical image (formed via one or more light sources through one or more holographic elements) could actually approximate the parcel in two- or three-dimensional space precisely indicating to the user where to place the parcel in an preferred orientation to most efficiently achieve a good scan. A three-dimensional image may be advantageously visible from several directions, and would also be visible without having to place the parcel within the scan volume.

Figure 5:
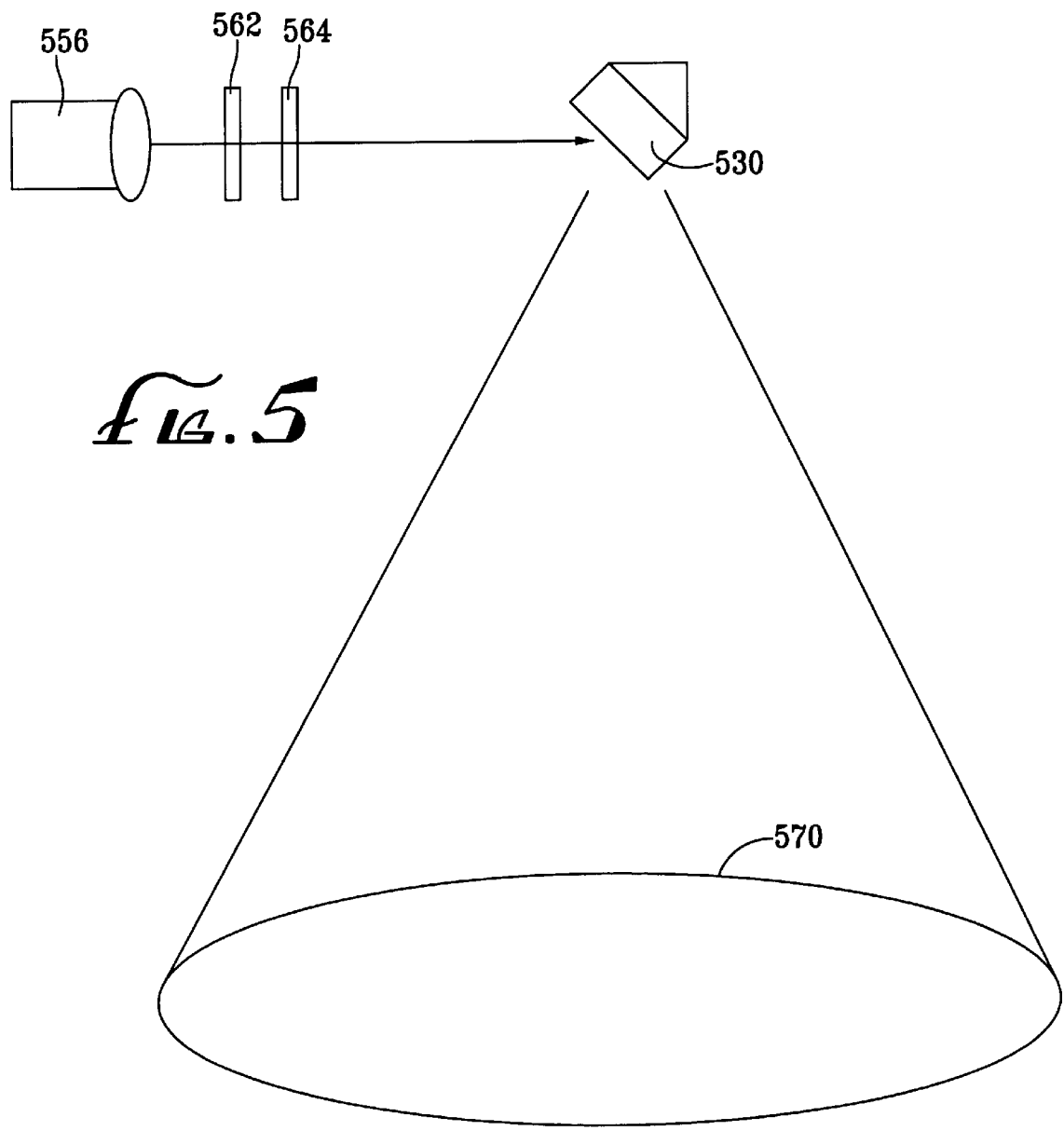
FIG. 5 is a schematic of an aiming system according to another embodiment of the present invention.

FIG. 5 illustrates another alternate embodiment with one or more diffractive or holographic element(s) 562, 563 disposed in the beam path (e.g. adjacent the light source) to project a visible image off fold mirror 530 into the scan volume. The diffractive or holographic element(s) 562, 563 could produce a variety of geometric shapes or formations providing the desired visual aid 570 within the scan volume. Such a holographic system need not require a scanning mechanism to produce the desired image in the scan volume. In a proper structure such as with additional optical elements in the user's field of view, such configuration may produce a holographic image, particularly a multi-dimensional (two- or even three-dimensional) holographic image within the scan volume. For example, the image (formed via one or more light sources through one or more holographic elements) could actually approximate the parcel in three-dimensional space precisely indicating to the user where to place the parcel in an desired orientation to most efficiently achieve a good scan. Such a three-dimensional image may be advantageously visible from several directions, and would also be visible without having to place the parcel within the scan volume.

A preferred embodiment for producing the desired target patterns or images is using one or more suitable holographic or diffractive optical elements. Currently diffractive optics, made from glass (e.g. fused silica), plastic (e.g. acrylic) or IR materials provide the preferred construction. A laser beam, produced by a separate laser source or split off from the scanning beams, is passed through the diffractive optic and directed into the scan volume at the desired location. Such diffractive optics may be obtained from a suitable manufacturer such as MEMS OPTICAL INC. of Huntsville, Ala. U.S.A. The diffuser optics split the laser beam into a desired pattern. Custom diffuser optics may be manufactured to create a light pattern comprising the company logo, for example, to serve as the aiming aid/target. Alternately, the aiming light pattern may comprise an image with details of a packaging label which would specifically guide the user to place the label on the package in the same location and orientation as the label image in the scan volume.

Figure 6:
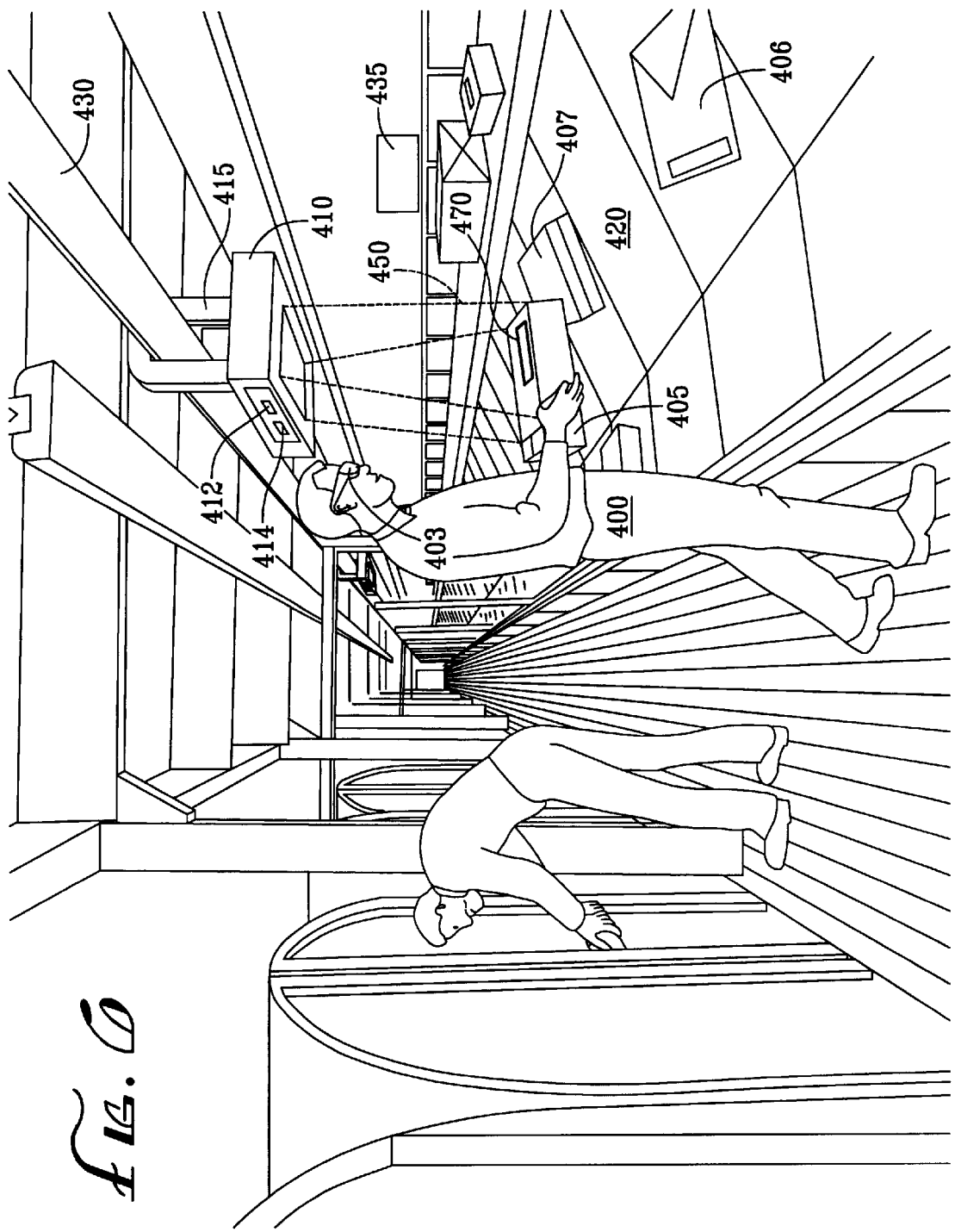
FIG. 6 is a layout view of a preferred overhead scanning station.

FIG. 6 illustrates an overall scan station employing an aiming aid as in any of the previous embodiments. In this environment, the operator 400 is required to move a parcel 405 from a conveyor 420 and scan the label thereon. The scanner 410 is located above the scan volume to allow the user 400 to visually locate the label on the top of the package and then orient the package in the scan volume. The scanner 410 may be located overhead (i.e. directly over the scan volume) or on a wall or support opposite the user 400 to one side of the scan volume, preferably out of the way to allow unhindered movement of the parcels 405–407. The scanner 410 may be mounted on a support 415, the support 415 being movable along a track 430 to permit its position to be adjusted. The scanner 410 generates a scan pattern and directs it downwardly producing a scan volume 450 in which the operator 400 must place the parcel 405. The aiming aid 470 in the figure is shown as a square. By the time the operator locates the aiming aid 470 on the package and commences to move the label toward it, the sufficiently dense scan pattern likely already scanned the bar code and the scanner provides the familiar "beep" signal indicating a successful read.

To further assist in locating the scan volume, the scanner 410 may produce a light curtain producing a visible cone of light (also designated by 450). The cone of light could be produced by a suitable visible light source such as incandescent, LED's, halogen, or the like or may be formed via holographic elements in similar fashion as the aiming aid described above in previous embodiments.

Though the aiming aid is particularly useful for overhead scanners and other fixed scanners, the aiming aid may also be employed by other data reading systems including: CCD readers, video readers, portable or handheld scanners (laser based, LED or CCD), combination fixed/portable scanners. Such combination fixed/portable scanners are described in U.S. Ser. No. 08/792,829 hereby incorporated by reference. In such a system, the aiming aid, either by the choice of the operator or by design, may be selectively activated only during certain uses such as by manual activation of a switch or when the scanner is being used in a given mode of operation (e.g. fixed versus handheld). Alternately, the scanner may employ different shapes of aiming aids for different modes of operation. For example, one shape of aiming aid consisting of a plurality of linearly arranged spots may be employed to assist in aiming the single line pattern while a different shape aiming aid consisting of a two-dimensional image (e.g. a bar code) may be employed for the complex scan line pattern.

The aiming aid may be specifically tailored for a given application and remain constant during operation. Alternately, the system may comprise a changeable or adaptable aiming aid, turning the aiming aid on or off depending upon various conditions. For example in a dual window/dual mode scanner, the aiming aid may comprise a two-dimensional image out of the first window and into the scan volume for the omni-directional scanning operation and the aiming aid may be either off or a single bright line passing out the second window for guiding the user to aim the single scan line pattern.

In one embodiment, the aiming aid may be manually selected by the user 400. Manually actuated switches 412, 414 may be provided to allow the user to select a desired aiming aid. For example, actuating switch 412 selects a first aiming aid comprising a label image corresponding to a letter pack at a preferred height within the scan volume. Actuating switch 414 selects a second aiming aid comprising a label image corresponding to a shipping box at a preferred (possible different) height within the scan volume.

Figure 7:
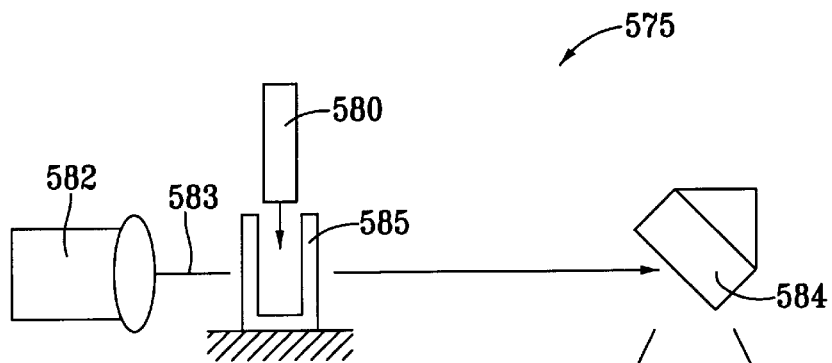
FIG. 7 is a diagrammatic view of an alternate system with interchangeable diffuser optics.

Alternately, the aiming aid may be automatically selected dependent upon external conditions. For example, as shown in the aiming aid system 575 in FIG. 7, the user (or OEM) may be provided with a plurality of diffuser optics comprising a diffuser plate 580 removably mounted in a holder bracket 585. A laser source 582 produces a laser beam 583 along a path in which the diffuser plate 580 is placed. The image beam is then reflected off fold mirror 584 and directed into the scan volume. The user may select a desired diffuser optic for the particular operation by removing the plate 580 from the holder and replacing it with a different plate. For example, in an application where the overhead scanner is being used for scanning labels on letter parcels, a diffuser optic which produces a letter parcel label focussed to a distance optimized for reading labels positioned conveniently for placing the letter parcels is selected and installed in the holder bracket 585. In order to change to a different type of parcel, for example file box-sized parcels, another diffuser optic, which produces a label image 587 focussed to a distance optimized for reading labels positioned conveniently for placing the file box-sized parcels, is selected and installed in the holder bracket 585. The overhead scanner operation may also be adjusted accordingly such as by changing focal distance to correspond to the type of object being scanned.

The system may also automatically adapt according to sensing of different package types. Sensing and parcel gating systems may be employed to determine the type of item being placed within the scan volume such as disclosed in U.S. Pat. No. 4,939,355 hereby incorporated by reference. Once the type of item has been determined, the system may automatically select the corresponding aiming aid image. As shown in FIG. 8, the system 600 may include a rotating holographic disk 605 having different sectors 606, 607, 608, 609 corresponding to different aiming aids. Similar to the previous systems, a laser source, a laser source 602 produces a laser beam 603 along a path in which the diffuser section 607 is located. The image beam is then reflected off fold mirror 604 and directed into the scan volume. Once the system 600 has determined the type of item in the scan volume (e.g. letter parcel), the disk 605 is rotated to place the proper sector (e.g. sector 607 as shown) into position and thereby creating the desired graphic image (e.g. the company logo 615 at the desired position).

Holographic images generally require the light to be heading toward the user in order to view them. If all the optics are in the scanner housing (which may be desirable to achieve system integration), then the scanner window would necessarily have to face the user. In the embodiment of an "L" scanner such as the PSC Inc. Magellan™ scanner, the vertical window is oriented facing the user and provides a convenient location for the holographic light to be emitted. If it were desired to integrate the holographic generator within an overhead scanner 410 of FIG. 6, such a configuration would likely require placing reflective surface(s) in the wall opposite the scan region (for example a mirror 435 mounted on the wall opposite the user 400), or by having some diffusing media (e.g. smoke, fog, etc.) in the scan region.

Other enhancements may be included to enhance aiming aid visibility (e.g. image clarity, location or brightness) or usefulness. For example, the user 400 may be equipped with special goggles or glasses 403 including (a) special lens optics or shutters designed to enhance aiming aid visibility; (b) lens optics, shutters, or polarized lens elements which are electronically controlled to correspond to aiming aid generation (such as used in computer/3D visuals in the entertainment industry); (c) tinted lens elements to provide better contrast for the aiming aid.

Thus, a scanning system and method including an aiming aid have been shown and described. It is intended the aiming systems disclosed may be combined with any suitable collecting configuration or outgoing light configurations. Though certain examples and advantages have been disclosed, further advantages and modifications may become obvious to one skilled in the art from the disclosures herein.

What is claimed is:

1. A data reading system for scanning items in a scan volume., comprising a data reader positioned above a scan volume;
   a light source for producing a reading beam;
   a polygon mirror having an axis of rotation and a plurality of mirror facets disposed about an outer periphery, the polygon mirror being rotated about the axis for scanning the reading beam to project a scan pattern into the scan volume for reading objects in the scan volume;
   a secondary scan mirror disposed on one end of the polygon mirror along the axis, for producing an aiming aid in the scan volume, wherein the aiming aid is formed by a laser beam directed alone a line parallel to the axis of rotation and onto the secondary mirror, whereby the laser beam is scanned by the secondary scanning mirror drawing out a two-dimensional pattern projected into the scan volume.

2. A data reading system according to claim 1 wherein the laser beam draws out a circular pattern comprising the aiming aid.

3. A data reading system according to claim 1 further comprising
   a tertiary scanning mirror disposed on the end of the polygon mirror wherein the aiming aid is formed by the laser beam scanned by the secondary scanning mirror and the tertiary mirror and projected into the scan volume.

4. A data reading system according to claim 1 wherein the aiming aid is selected from the group consisting of: a circle, a rectangle, an ellipse.

5. A data reading system for scanning items in a scan volume, comprising
   a data reader mounted in a fixed position above a scan volume and projecting a scan pattern downwardly into the scan volume;
   means for producing an aiming aid in the scan volume for assisting a user in positioning an item to be scanned,
   wherein the aiming aid comprises a multi-dimensional graphics image projected into the scan volume.

6. A data reading system according to claim 5 wherein the data reader is constructed and arranged to read labels on parcels and wherein the image comprises a graphical representation of a parcel label.

7. A data reading system according to claim 5 wherein the image comprises a company logo.

8. A data reader according to claim 5 wherein the data reader is selected from the group consisting of: laser scanner, CCD scanner, and LED scanner.

9. A data reading system for scanning items in a scan volume, comprising
   a data reader mounted in a fixed position above a scan volume and protecting a scan pattern downwardly into the scan volume;
   a laser beam source producing a laser beam along a beam path;
   a diffractive optic disposed in the beam path and forming a multi-dimensional image in the scan volume comprising an aiming aid for assisting a user in positioning an item to be scanned.

10. A data reading system for scanning items in a scan volume, comprising
    a data reader mounted in a fixed position above a scan volume and projecting a scan pattern downwardly into the scan volume;
    means for producing an aiming aid in the scan volume for assisting a user in positioning an item to be scanned,
    wherein the means for forming an aiming aid comprises a laser beam source producing a laser beam along a beam path and a holographic element disposed in the beam path and forming a multi-dimensional image.

11. A method of data reading comprising the steps of
    generating a scan pattern and passing the scan pattern into a scan volume;
    passing a laser beam through an optical system and forming a multi-dimensional graphic image within the scan volume;
    permitting the user to use the graphic image as a guide for placing an article being scanned at a desired location within the scan volume.

12. A method according to claim 11 wherein the optical system comprises a diffractive optic.

13. A method according to claim 11 wherein the optical system comprises a holographic optic.

14. A method according to claim 11 further comprising
    reading labels on parcels being placed in the scan volume;
    forming the multi-dimensional image into a graphical representation of a parcel label.

15. A method according to claim 11 further comprising
forming the multi-dimensional image into a company logo.

16. A method according to claim 11 further comprising forming the multi-dimensional image into a two-dimensional geometric figure.

17. A method of data reading comprising the steps of
generating a scan pattern and passing the scan pattern into a scan volume from a position outside the scan volume;
projecting a multi-dimensional aiming aid into the scan volume at a desired position;
using the aiming aid as a guide for placing an article being scanned at a desired position within the scan volume.

18. A method according to claim 17 further comprising forming the aiming aid as a graphic image by passing a laser beam through a diffractive optic.

19. A method according to claim 17 further comprising
reading labels on parcels being placed in the scan volume;
forming the graphic image into a graphical representation of a parcel label.

20. A method according to claim 17 further comprising forming the multi-dimensional aiming aid as a two-dimensional geometric figure.

21. A method according to claim 17 further comprising
providing a plurality of aiming aids corresponding to different types of items;
sensing a type of item being placed in the scan volume;
automatically selecting a given aiming aid corresponding to the type of item having been sensed;
projecting the given aiming aid into the scan volume.

22. A method according to claim 17 further comprising
providing a plurality of aiming aids;
allowing a user to select one of the plurality of aiming aids;
projecting the given aiming aid into the scan volume.

* * * * *